United States Patent [19]

Goscenski, Jr.

[11] 4,412,459

[45] Nov. 1, 1983

[54] CONTROLLED DIFFERENTIAL

[75] Inventor: Edward J. Goscenski, Jr., Battle Creek, Mich.

[73] Assignee: Eaton Corporation, Cleveland, Ohio

[21] Appl. No.: 254,355

[22] Filed: Apr. 15, 1981

[51] Int. Cl.³ .............................................. F16H 1/44
[52] U.S. Cl. ..................................... 74/711; 74/713
[58] Field of Search ................... 74/713, 711, 710.5, 74/695, 694; 192/96, 85 CA

[56] References Cited

U.S. PATENT DOCUMENTS

| | | | |
|---|---|---|---|
| 3,195,371 | 7/1965 | Christie | 74/710.5 |
| 3,265,173 | 9/1966 | Russell | 74/710.5 |
| 3,383,953 | 5/1968 | Christenson | 74/710.5 |
| 3,392,601 | 7/1968 | Roper | 74/711 |
| 3,659,480 | 5/1972 | Koivunen | 74/710.5 |
| 3,788,166 | 1/1974 | Hart et al. | 74/710.5 |
| 3,818,781 | 6/1974 | Goscenski, Jr. | 74/711 |
| 3,871,249 | 3/1975 | Jeffers | 74/711 |
| 3,974,717 | 8/1976 | Breed et al. | 74/710.5 |
| 4,070,924 | 1/1978 | Moreno | 74/710.5 |
| 4,077,279 | 3/1978 | Goscenski, Jr. | 74/713 |
| 4,113,044 | 9/1978 | Williams | 74/710.5 |
| 4,207,780 | 6/1980 | Saxton | 74/710.5 |

FOREIGN PATENT DOCUMENTS

| | | | |
|---|---|---|---|
| 1138597 | 10/1962 | Fed. Rep. of Germany | 74/710.5 |
| 2235107 | 7/1972 | Fed. Rep. of Germany | 74/711 |
| 2920107 | 11/1980 | Fed. Rep. of Germany | 74/711 |

*Primary Examiner*—Kenneth Dorner
*Assistant Examiner*—D. Wright
*Attorney, Agent, or Firm*—C. H. Grace; L. J. Kasper

[57] ABSTRACT

A differential assembly 10 includes a casing 12, a carrier 14, a planetary gear set 18 supported by the carrier for effecting rotation of the carrier, an input 20 for driving the planetary gear set to effect rotation of the carrier, pinion means 42, 44 supported by the carrier for rotation therewith, a pair of side gears, 38, 40 meshing with the pinion means and first and second outputs 34, 36 driven by the side gears. A clutch means 50 having an actuated condition for retarding relative rotation of the side gear 40 with respect to the carrier 14 is provided. The planetary gear set is operable to actuate the clutch means 50 upon axial movement of the planetary pins 26 to retard relative rotation of one of the side gears and the carrier upon the occurrence of a predetermined condition.

30 Claims, 4 Drawing Figures

4,412,459

1

CONTROLLED DIFFERENTIAL

BACKGROUND OF THE INVENTION

1. Field of the Invention

The present invention relates to a differential assembly for a vehicle and more particularly to a differential assembly including a clutch means for retarding relative rotation of one of the side gears and the carrier and wherein the differential assembly is driven through a planetary gear set which is also operable to actuate the clutch means.

2. Background of the Invention

Differential gear mechanisms are known in the art which are utilized to compensate for slipping of one of the drive wheels of a pair of drive wheels of a vehicle. Various means have been provided for retarding rotation of one of the wheels of the vehicle relative to the other wheel of the vehicle upon the occurrence of a predetermined condition. The predetermined condition can be the manual actuation of the clutch means, the sensing of relative rotation between the output wheels, turning or low speed operation such as when the vehicle is operating in a particular gear range. The Moreno U.S. Pat. No. 4,070,924 and the Breed U.S. Pat. No. 3,974,717 both disclose examples of prior art devices which are manually actuated to effect lock up of the differential. Hart et al. 3,788,166 discloses a differential which is manually actuatable and which permits differential operation only in the high operating speed ranges of the transmission and which prevents differential operation in the low operation speed ranges. Williams U.S. Pat. No. 4,113,044 and Jeffers U.S. Pat. No. 3,871,249 are other examples of prior art differentials which are actuated upon the occurrence of a predetermined condition. The applicant is not aware of any prior art differentials including a clutch mechanism which is actuated via a planetary gear means which also serves to provide the input for driving the differential.

SUMMARY OF THE INVENTION

A provision of the present invention is to provide a new and improved differential assembly including a casing, a carrier, a planetary gear set supported by the carrier, an input for driving the planetary gear set to effect rotation thereof, pinion means supported by the carrier for rotation therewith, a pair of side gears meshing with the pinion means, and first and second outputs driven by the side gears. A clutch means is provided for retarding relative rotation of one of the side gears and the carrier and the planetary gear set is operable to actuate the clutch to retard relative rotation of one of the side gears and the carrier upon the occurrence of a predetermined condition.

A further provision of the present invention is to provide a new and improved differential assembly as set forth in the preceding paragraph wherein the planetary gear set includes a plurality of planet pins for supporting a plurality of planet gears with the planet pins being operable to engage with the clutch means to effect actuation of the clutch to retard relative rotation of one of the side gears and the carrier upon the occurrence of the predetermined condition.

Still another provision of the present invention is to provide a new and improved differential assembly including a carrier, gear reduction means for driving the carrier, pinion means secured by the carrier for rotation therewith, side gear means operatively associated with the pinion means and providing first and second outputs and clutch means having an actuated condition for retarding the relative rotation of the first and second outputs and an unactuated condition. The gear reduction means is operable to actuate the clutch means to retard the relative rotation of the first and second outputs upon the occurrence of a predetermined condition.

Another provision of the present invention is to provide a new and improved differential assembly as set forth in the preceding paragraph further including a first cam means operatively associated with the clutch means and second cam means operatively associated with said side gear means for rotation with one of said outputs, said first and second cam means being operatively connected to apply a force to actuate said clutch means upon relative rotation of said first and second cam members.

DETAILED DESCRIPTION

Figure 1:
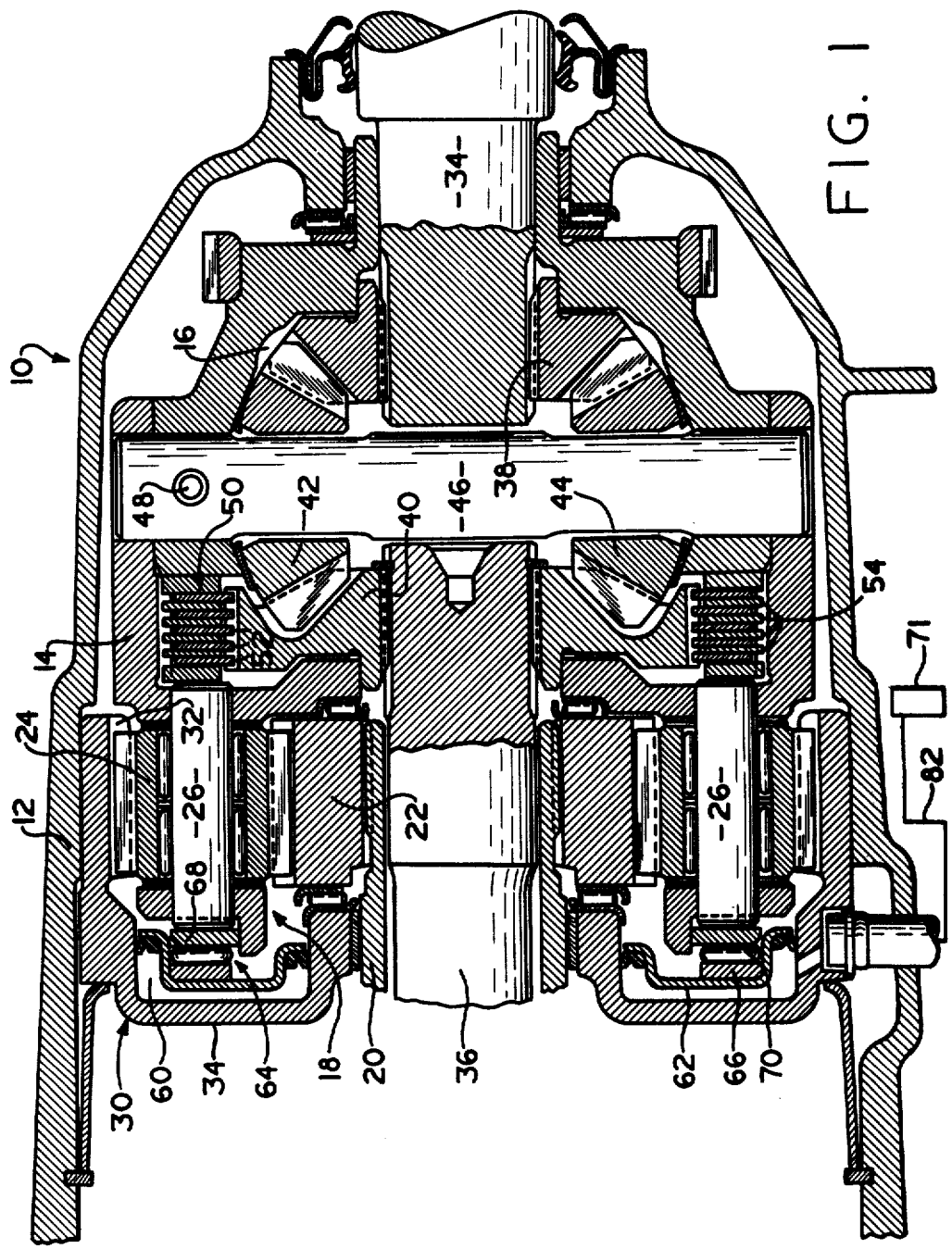
FIG. 1 is an axial cross section of the differential assembly of the present invention.

The differential drive assembly 10, illustrated in FIG. 1, is especially suitable for use in driving ground or surface engaging traction wheels of a vehicle. The differential drive assembly includes a housing 12 having a rotatable gear carrier 14 and a differential gear train 16 supported therein. A gear reduction means illustrated as a planetary gear set 18 is provided for effecting rotation of the gear carrier 14.

The input to the differential drive assembly 10 is through a shaft 20 which may be drivingly connected with a transmission, not illustrated, of a vehicle. The shaft 20 projects into the casing 20 and is splined at its inner end to a sun gear 22 of the planetary gear set 18. The shaft 20 effects rotation of the sun gear 22 in a well known manner.

The planetary gear set 18 includes a plurality of planet gears 24 which meshingly engage with the sun gear 22. A plurality of planet pins 26 are supported by the gear carrier 14 and each of the planet pins 26 supports one of the planet gears 24 for rotation. A ring gear assembly 30 is rigidly affixed to the casing 12 and includes an annular inwardly facing ring gear portion 32 and a radially inwardly extending portion 34 which will be more fully described hereinbelow. The ring gear 32 meshingly engages with the planetary gears 24. Rotation of the input shaft 20 and sun gear 22 effects rotation of the planet gears 24 which react against the fixed ring gear 32 to effect rotation of the carrier 14 in a well known manner.

The carrier 14 also supports the differential gear train 16 and the rotation of the carrier 14 by the planetary gear set 18 will effect rotation of the differential gear train 16.

The differential gear train 16 is operable to transmit the rotary motion of the gear carrier 14 to a pair of output shafts 34, 36. The gear train 16 includes a pair of bevel side gears 38 and 40 which are, respectively, splined to the output shafts 34 and 36 and a pair of bevel pinion gears 42 and 44. The pinion gears 42 and 44 are disposed between and mesh in engagement with the side gears 38, 40 for drivingly connecting the latter. The pinion gears 42 and 44 are rotatably supported in the carrier 14 by means of a pinion shaft 46 which extends across the carrier 14 and is secured thereto by an anchor pin 48.

The side gears 38, 40 and pinion gears 42, 44 are, in the preferred embodiment, all bevel gears of conventional form as far as the teeth thereof are concerned, and the tooth profiles are of a conventional shape having pressure angle values coming within the usual range of such values. The structure and operation of a differential gear mechanism utilizing a differential gear train such as the gear train 16, is more fully disclosed in U.S. Pat. No. 3,392,601 which is incorporated herein by reference. It should be obvious, however, that rotation of the carrier 14 by the planetary gear set 18 effects rotation of the pinion shaft 46 therewith which establishes a rotational reaction between the pinion gears 42 and 44 and the side gears 38 and 40 to effect rotation of the output shafts 34 and 36 which are each preferably connected to a driving wheel of a vehicle.

The present differential 10 is a limited slip or locking type differential which functions to transmit torque to one of the side gears 38, 40 if the other of the side gears begins spinning at too high a rate. To this end, the differential assembly 10 includes a limited slip clutch mechanism 50 for retarding relative rotation of the side gear 40 and the carrier 14. While a limited slip mechanism 50 has been illustrated it should be appreciated that a locking mechanism which locks the side gear 40 to the carrier 14, rather than allowing limited rotation therebetween, could also be utilized without departing from the scope of the present invention.

The limited slip clutch mechanism 50 comprises a disc pack which includes a plurality of discs 52 which are splined or keyed to the side gear 40 to rotate therewith and a plurality of discs 54 which are interposed or interdigitated with the discs 52 and which are keyed to the carrier 14 for rotation therewith. The discs 52 and 54 have an unactuated condition in which the discs are spaced apart from each other, and an actuated condition during which frictional engagement between the discs 52 and 54 causes a transmission of torque from the carrier 14 directly to the side gear 40. While the discs 52, 54 have been described as spaced apart during an unactivated condition, it should be appreciated that the discs 52 and 54 may rub on each other when in a nonactuated condition. However, there is no substantial pressure in an axial direction engaging the discs 52 and 54 and, for all practical purposes, the discs may be described as spaced apart. The degree of frictional engagement between the discs 52 and 54 controls the transfer of torque between the carrier 14 and the side gear 40. Depending upon the degree of pressure between the plates 52 and 54, a limited slip or locking of the side gear 40 and carrier 14 can occur.

The disc pack 50 functions to retard or prevent differentiating action between the side gear 40 and the carrier 14. The disc pack 50 is actuated by loading the disc pack in a direction substantially parallel to the axis of rotation of the discs 52, 54. The axial loading is effected by the plurality of planet pins 26 which are operable to move axially of the carrier 14 in response to the occurrence of a predetermined condition.

An annular fluid cylinder 60 is disposed within the radially extending portion 34 of the ring gear assembly 30. An annular piston 62 is disposed within the annular cylinder 60. The piston 62 is operable to move in a direction substantially parallel to the axis of rotation of the planetary gear set 18 and discs 52, 54 upon the introduction of fluid to the cylinder 60. A thrust bearing 64 is disposed between the piston 62 and one end of the planet pins 26 to transfer axial movement from the piston 62 to the plurality of planetary pins 26 supported in the carrier 14. Thrust bearing 64 includes a washer 66 which engages with the piston 62 and a washer 68 which engages with one end of the planet pins 26. A plurality of needle bearings 70 are disposed between the washers 66 and 68 to form the thrust bearing 64 in a well known manner. It should be apparent that axial movement of the piston 62 will effect axial movement of the planetary pins 26 to effect axial loading of the disc pack 50 to inhibit the differentiating action of the differential gear train 16. If it is desired, additional axial pins which do not support planet gears may be supported by the carrier 14 to transfer forces from the piston 62 to the disc pack 50. The additional axial pins, not illustrated, may be in addition to, or may substitute for, the pins 26 but function in an identical manner to transfer forces in an axial direction from the piston 62 to the disc pack 50.

Figure 2:
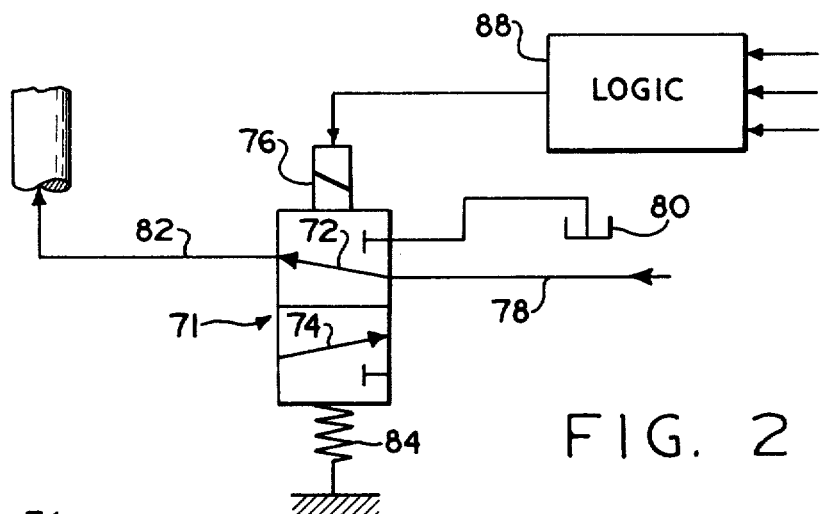
FIG. 2 is a schematic illustration of a fluid control system for controlling actuation of the clutch means.

A valve means 71, as is illustrated in FIG. 2, is provided for controlling fluid flow to a passageway 82 which is connected to the annular fluid chamber 60 to thereby control movement of the piston 62 and the differentiating action of the differential gear train 16. The valve means 71 includes a valve body having a pair of passageways 72 and 74 therein. The valve body is operable to be moved between first and second positions by a solenoid 76 and a return spring 84. When the valve body is in its nonactuated condition, the fluid passageway 74 in the valve body is operable to connect the fluid line 82 to a fluid sump 80 to thereby drain fluid cylinder 60 to deactuate the clutch means 50. When the solenoid 76 is actuated to overcome the force of the return spring 84, the valve body is moved to its illustrated position in which the passageway 72 is operable to connect the fluid passageway 82 with a fluid supply passage 78 to thereby pressurize cylinder 60 and actuate clutch means 50.

The fluid supply passage 78 in the preferred embodiment may be connected to the first gear and reverse gear clutch of the transmission, not illustrated, of the vehicle. In addition, the electrical control 88 for energizing the solenoid 76 may be connected to the transmission to energize solenoid 76 only when the transmission is in first or reverse gear. Thus, when the transmission is in first gear or reverse gear, it will be operable to pump fluid through the fluid passageway 78, through the passageway 72 in the valve means 71 and to the passageway 82 to effect movement of the piston 62 in an axial direction and actuation of the clutch means 50. When the transmission is in first or reverse, the solenoid 76 will be actuated to position the valve body in its position illustrated in FIG. 1. When the transmission is in any other condition such as second, third, or fourth gear, the solenoid 76 is deactuated and the sump 80 is connected via the passageway 74 and 82 to the annular piston chamber 60 to bleed chamber 60 and cause retraction of the piston 62 and deactivation of clutch means 50. Such a structure will allow the limited slip mechanism 50 to be engaged only when the transmission is in first gear or reverse gear and to be disengaged at all other times.

Other schemes for actuating the valve 70 could be utilized without departing from the scope of the present invention. For example, rather than connecting the solenoid 76 to the transmission it would be possible to provide for manual actuation of the solenoid 76 by an operator of the vehicle or it would be possible to monitor inputs such as wheel speed, change in wheel speed, vehicle speed, etc. and utilize the logic control 88 to effect automatic actuation of the solenoid valve 76 and clutch means 50 dependent upon such sensed inputs. Additionally, while valve 71 has been illustrated as comprising a solenoid operated valve, it should be apparent that other types of valves, such as mechanically actuated valves, could be utilized without departing from the scope of the present invention. Also, rather than an on-off valve as illustrated, relief or proportional valves could be utilized.

Figure 3:
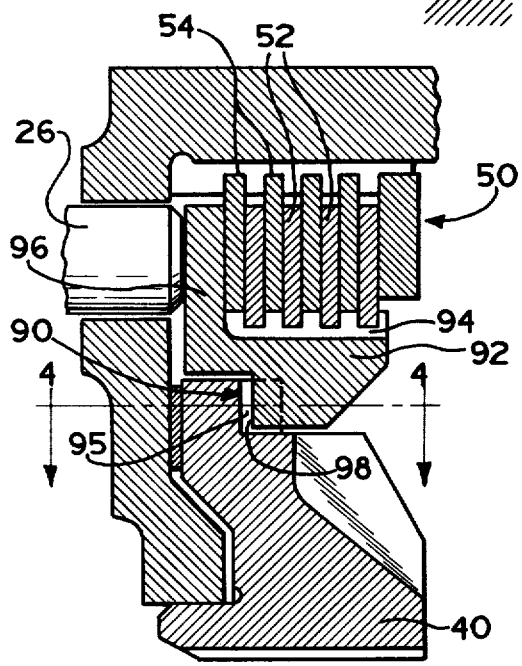
FIG. 3 is a fragmentary cross section similar to FIG. 1 taken approximately along lines 3—3 of FIG. 4 of the torque multiplier structure which may be utilized in an alternate embodiment of the preferred invention.
Figure 4:
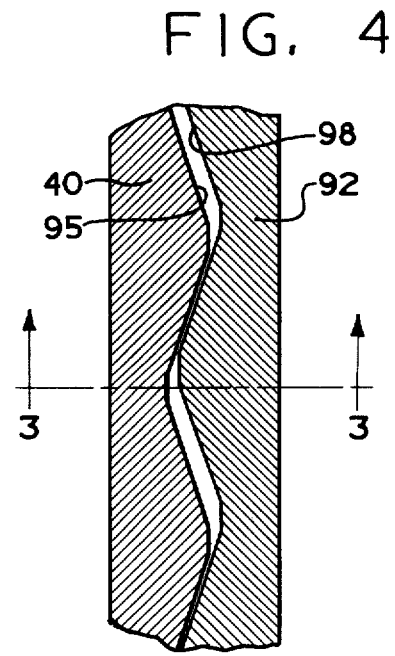
FIG. 4 is a fragmentary cross section of the torque multiplier structure taken approximately along lines 4—4 of FIG. 3.

FIGS. 3 and 4 disclose an alternate embodiment of the present invention wherein a torque multiplier structure 90 is utilized to increase the force acting on the disc pack 50. If sufficient force cannot be transmitted through the planet pins 26 or if it is desired to reduce the force being transmitted to the planet pins 26, the torque multiplier 90 can be utilized. The torque multiplier reduces the force being transmitted through the pins 26.

The torque multiplier includes a cam plate 92 which is interposed between the side gear 40 and the disc pack 50 and a cam 95 which is formed integrally with the side gear 40. The cam plate 92 is interposed between the cam surface 95 of the side gear 40 and includes a splined portion 94 through which the cam plates 52 are splined at their inner diameter. A radially extending portion 96 is provided on the cam plate 92 to transmit axial forces to the disc pack 50 from the planetary pins 26. It should be appreciated that the cam plate 92 is operable to rotate with the disc members 52 which are operable to rotate relative to the carrier 14. The cam plate 92 includes a cam surface 98 which is operable to engage with the cam surface 95 disposed on the cam gear which is integrally formed with the side gear 40. When the piston 62 is moved to effect movement of the planet pins 26, the planet pins will apply a force to the portion 98 of the cam plate 92 to cam the discs 54 and 52 together. The axial force exerted by the pins 26 provides a retarding torque to the cam plate 92. Since the cam gear 95 is rotating with respect to the carrier 14 and is interconnected with the cam plate 92 which is retarded by the discs 52, the action between the two cam surfaces 95, 98 will cause a separating force between the cam plate 92 and the cam surface 95 on the side gear 40. This separating force is further transmitted between the carrier and the disc pack 50, thus increasing the retarding torque of the disc pack 50 on the cam plate 92. This additional retardation of the cam plate 92 will cause the cam surfaces 95, 98 to further ramp apart and increase the separating force and the force acting on the disc pack 50 in an axial direction. Thus, the retarding force acting on the side gear 40 will further increase in bootstrap fashion until equilibrium is reached.

By properly designing the cam angles on the cam surfaces 95, 98 the force transmitted between the carrier 14 and the discs 50 through the cams could be approximately three times that transmitted through the planet pins 26. Thus, the total torque will be four times that which would normally be expected without the torque multiplier 90. Furthermore, for a given design, this ratio of total force to pin force will remain relatively constant. By changing cam angles, the ratio can be changed to anything from 1.00:1 to infinity. However, if the ratio is near 1.00:1, there is very little gain and, thus, the system is not very practical. But, if the ratio is too high, the performance is unstable and could be affected by temperature. Accordingly, proper cam angles must be chosen.

The differential drive mechanism 10 of the present invention provides a compact light-weight differential drive mechanism which can be manually operated or operated automatically through a control system. While the system has been disclosed as being connected to the transmission and responsive thereto it should be appreciated that sensors could be provided to sense the slip between the output shafts 34 and 36 and energize the solenoid 76 to provide a flow to the chamber 60 which is proportional to the amount of slip present between the output shafts 34 and 36. This would allow the clutch mechanism 50 to inhibit the relative rotation between the side gear 40 and the carrier 14 by an amount which is proportional to the amount of slip present between the output shafts 34 and 36. Thus, it should be appreciated that a small light weight accurately controllable differential assembly has been provided. This assembly is particularly adaptable to front wheel drive vehicles wherein size and weight are extremely important.

From the foregoing it should be apparent that a new and improved differential assembly has been provided. The differential assembly includes a casing 12, a carrier 14, a planetary gear set 18 supported by the carrier and an input 20 for driving the planetary gear set to effect rotation of the carrier 14. Pinion means is supported by the carrier for rotation therewith and a pair of side gears 38, 40 meshes with the pinion means. A first output 34 is driven by one of the side gears 38 and a second output 36 is driven by the other of the side gears 40. A clutch means 50 is provided for retarding the relative rotation of one of the side gears and the carrier 14. The planetary gear set 18 is operable to actuate the clutch means via the planet pins 26 to retard relative rotation of one of the side gears and the carrier upon the occurrence of a predetermined condition.

I claim:

1. A differential assembly comprising a casing, a carrier, a planetary gear set supported by said carrier, an input for driving said planetary gear set to effect rotation of said carrier, pinion means supported by said carrier for rotation therewith, a pair of side gears meshing with said pinion means, a first output driven by one of said side gears, a second output driven by the other of said side gears, and clutch means having an actuated condition for retarding the relative rotation of one of said side gears and said carrier and an unactuated condition, said planetary gear set including means movable to move said clutch means toward said actuated condition to retard relative rotation of one of said side gears and said carrier upon the occurrence of a predetermined condition.

2. A differential assembly as defined in claim 1 wherein said planetary gear set includes a sun gear connected to said input, a plurality of planet gears meshing with said sun gear, a plurality of planet pins supported by said carrier and each of which supports one of said planet gears, said planet pins being operable to engage with said clutch means to effect actuation of said clutch means to retard relative rotation of one of said side gears and said carrier upon the occurrence of said predetermined condition.

3. A differential assembly as defined in claim 2 wherein said clutch means includes a first plurality of clutch plates operatively associated with said one side gear for rotation therewith and a second plurality of clutch plates operatively associated with said carrier for rotation therewith, said first and second plurality of clutch plates being interdigitated and having a spaced apart relationship when said clutch means is in said unactuated condition and an engaging relationship when said clutch means is in said actuated condition.

4. A differential assembly as defined in claim 3 wherein said planet pins are operable to engage with and bias said first and second plurality of clutch plates in a direction substantially parallel to the axis of rotation of said first and second plurality of the clutch plates to effect axial movement of said first and second clutch plates to said actuated condition.

5. A differential assembly as defined in claim 4 wherein each of said planet pins is supported in said carrier for movement in a direction substantially parallel to the axis of rotation of said first and second plurality of clutch plates.

6. A differential assembly as defined in claim 2 further including fluid actuated piston means disposed within said casing for effecting movement of said planet pins to effect actuation of said clutch means to retard relative rotation of said one side gear and said carrier upon the occurrence of a predetermined condition.

7. A differential assembly as defined in claim 6 further including valve means controlling the fluid flow to said piston means to effect movement thereof, said valve means having a first condition providing for fluid flow to said piston means to effect movement of said planet pins to actuate said clutch means and a second condition blocking the flow of fluid to said piston means.

8. The differential assembly as defined in claim 7 further including a transmission for directing power from a primer mover and wherein said input is an output from said transmission, said valve means having said first condition providing for fluid flow to said piston means when said transmission is in a low gear forward drive condition and when said transmission is in a reverse condition, said valve means having said second condition blocking the flow of fluid to said piston means when said transmission is in a high gear forward drive condition.

9. A differential assembly as defined in claim 5 further including fluid actuated piston means disposed within said casing and movable in a direction substantially parallel to the axis of rotation of said first and second plurality of clutch plates for effecting movement of said planet pins to actuate said clutch means to retard relative rotation of one of said side gears and said carrier upon the occurrence of a predetermined condition.

10. A differential assembly as defined in claim 9 further including valve means for controlling the fluid flow to said piston means to effect movement thereof, said valve means having a first condition providing fluid flow to said piston means to effect movement of said planet pins to actuate said clutch means and a second condition blocking the flow of fluid to said piston means.

11. A differential assembly as defined in claim 9 wherein said casing is nonrotatable, said piston means including an annular piston cylinder located within said casing and an annular piston located within said piston cylinder and movable with respect thereto in a direction substantially parallel to the axis of rotation of said plurality of clutch plates.

12. A differential assembly as defined in claim 3 further including first cam means operatively associated with said first plurality of clutch plates for rotation therewith and second cam means operatively associated with said one side gear for rotation therewith, said first and second cam means being operatively connected to apply a force to actuate said clutch means upon relative rotation of said first and second cam means upon the occurrence of said predetermined condition.

13. A differential assembly as defined in claim 9 further including a nonrotatable ring gear means rigidly affixed in said casing, said ring gear means including an annular ring gear in meshing engagement with said plurality of planet gears and a radially extending portion which extends in a direction substantially perpendicular to the axis of rotation of said plurality of said clutch plates, said piston means including an annular fluid chamber disposed within said radially extending portion of said ring gear means and an annular piston disposed within said annular chamber and movable in a direction substantially parallel to the axis of rotation of said plurality of clutch plate means.

14. A differential assembly as defined in claim 12 wherein said planet pins are movable to engage said first cam means to effect movement of said first cam means and said first plurality of clutch plates to effect engagement of said first and second plurality of clutch plates and relative rotation of said first and second cam means to activate said clutch means and thereby retard relative rotation of said one side gear and said carrier upon the occurrence of a predetermined condition.

15. A differential assembly as defined in claim 14 further including fluid piston means engageable with said planet pins for effecting movement thereof to effect actuation of said clutch means.

16. A differential assembly comprising a carrier, gear reduction means for driving said carrier, pinion means supported by said carrier for rotation therewith, side gear means operatively associated with said pinion means, said side gear means providing first and second outputs, and clutch means having an actuated condition for retarding the relative rotation of said first and second outputs and an actuated condition, said gear reduction means including means movable to engage said clutch means and to cause actuation thereof to retard relative rotation of said first and second outputs upon the occurrence of a predetermined condition.

17. A differential assembly as defined in claim 16 wherein said gear reduction means includes a plurality of gears and a plurality of pins, one of which supports each of said gears, said pins being operable to engage with said clutch means to effect actuation of said clutch means to retard relative rotation of one of said first and second outputs upon the occurrence of a predetermined condition.

18. A differential assembly as defined in claim 16 wherein said gear reduction means includes a plurality of pins supported in said carrier for movement substantially parallel to the axis of rotation of said carrier, said plurality of pins being operable to move axially to engage with said clutch means to effect actuation of said clutch means to retard relative rotation of one of said first and second outputs upon the occurrence of a predetermined condition.

19. A differential assembly as defined in claim 17 wherein said gear reduction means comprises a planetary gear set and said plurality of gears comprise said planet gears.

20. A differential assembly as defined in claim 16 wherein said clutch means includes a first plurality of clutch plates operatively associated with said side gear means for rotation with one of said first and second ouputs and a second plurality of clutch plates operatively associated with said carrier for rotation therewith, said first and second plurality of clutch plates being interdigitated and having a spaced apart relationship when said clutch means is in said unactuated condition and engaging relationship when said clutch means is in said actuated condition.

21. A differential assembly as defined in claim 20 wherein said gear reduction means includes a plurality of gears and a plurality of pins, one of which supports each of said gears, said pins being operable of engage with said clutch means to effect actuation of said clutch means to retard relative rotation of one of said first and second outputs upon the occurrence of a predetermined condition.

22. A differential assembly as defined in claim 21 wherein each of said planet pins is supported in said carrier for movement in a direction substantially parallel to the axis of rotation of said first and second plurality of clutch plates.

23. A differential assembly as defined in claim 22, further including fluid actuated piston means for effecting movement of said planet pins to effect actuation of said clutch means to retard relative rotation of said first and second outputs upon the occurrence of a predetermined condition.

24. A differential assembly as defined in claim 18, further including valve means controlling the fluid flow to said piston means to effect movement thereof, said valve means having a first condition providing for fluid flow to said piston means to effect movement of said pins to actuate said clutch means and a second condition blocking the flow of fluid to said piston means.

25. A differential assembly as defined in claim 23, further including valve means controlling the fluid flow to said piston means to effect movement thereof, said valve means having a first condition providing for fluid flow to said piston means to effect movement of said planet pins to actuate said clutch means and a second condition blocking the flow of fluid to said piston means.

26. A differential assembly as defined in claim 25 further including a non-rotatable ring gear means, said ring gear means including an annular ring gear in meshing engagement with said plurality of planet gears and a radially extending portion which extends in a direction substantially perpendicular to the axis of rotation of said plurality of clutch plates, said piston means including an annular fluid chamber disposed within said radially extending portion of said ring gear means and an annular piston disposed within said annular chamber and movable in a direction substantially parallel to the axis of rotation of said plurality of clutch plates.

27. A differential assembly as defined in claim 20 further including first cam means operatively associated with said first plurality of clutch plates for rotation therewith and second cam means operatively associated with said side gear means for rotation with said one output, said first and second cam means being operatively connected to apply a force to actuate said clutch means upon relative rotation of said first and second cam means upon the occurrence of said predetermined condition.

28. A differential assembly as defined in claim 27 wherein said gear reduction means includes a planetary gear set including a plurality of planet gears and a plurality of planet pins, one of which supports each of said planet gears, and further including actuating means for effecting movement of said planet pins to operatively engage said planet pins with said clutch means to effect engagement of said first and second plurality of clutch plates.

29. A differential assembly as defined in claim 28 wherein said planet pins are movable by said actuating means to engage said first cam means to effect movement of said first cam means and said first plurality of clutch plates to effect engagement of said first and second plurality of clutch plates and relative rotation of said first and second cam means to actuate said clutch means and thereby retard relative rotation of said first and second outputs upon the occurrence of a predetermined condition.

30. A differential assembly as defined in claim 29 wherein said actuating means includes a fluid piston engageable with said planet pins for effecting movement thereof.

* * * * *